United States Patent
Pfeifer et al.

(10) Patent No.: US 7,431,895 B2
(45) Date of Patent: Oct. 7, 2008

(54) EXHAUST GAS TREATMENT UNIT FOR THE SELECTIVE CATALYTIC REDUCTION OF NITROGEN OXIDES UNDER LEAN EXHAUST GAS CONDITIONS AND A PROCESS FOR THE TREATMENT OF EXHAUST GASES

(75) Inventors: Marcus Pfeifer, Solingen (DE); Paul Spurk, Bad König (DE); Jürgen Gieshoff, Biebergemünd (DE); Yvonne Demel, Frankfurt (DE); Egbert Lox, Hanau (DE); Thomas Kreuzer, Karben (DE)

(73) Assignee: Umicore AG & Co. KG, Hanau (DE)

( * ) Notice: Subject to any disclaimer, the term of this patent is extended or adjusted under 35 U.S.C. 154(b) by 325 days.

(21) Appl. No.: 09/985,954

(22) Filed: Nov. 6, 2001

(65) Prior Publication Data

US 2002/0054844 A1   May 9, 2002

(30) Foreign Application Priority Data

Nov. 6, 2000   (DE) ............................... 100 54 877

(51) Int. Cl.
B01D 50/00   (2006.01)

(52) U.S. Cl. .................................... 422/177; 422/180

(58) Field of Classification Search ................ 422/171, 422/180, 177; 60/297, 301, 299
See application file for complete search history.

(56) References Cited

U.S. PATENT DOCUMENTS

| | | | |
|---|---|---|---|
| 5,120,695 A | | 6/1992 | Blumrich et al. |
| 6,173,568 B1 | * | 1/2001 | Zurbig et al. ............ 60/274 |
| 6,176,079 B1 | * | 1/2001 | Konrad et al. ............ 60/274 |
| 6,471,924 B1 | * | 10/2002 | Feeley et al. ............ 423/213.5 |
| 6,516,607 B1 | | 2/2003 | Brück et al. |
| 6,677,264 B1 | | 1/2004 | Klein et al. |
| 7,084,086 B2 | | 8/2006 | Kasahara et al. |

FOREIGN PATENT DOCUMENTS

| | | |
|---|---|---|
| DE | 198 06 062 A | 8/1999 |
| EP | 0 666 099 A | 8/1995 |
| EP | 0 723 805 A | 7/1996 |
| EP | 0 896 831 A1 | 2/1999 |
| EP | 0 907 010 A | 4/1999 |
| EP | 0 935 055 A | 8/1999 |
| EP | 0 957 242 A | 11/1999 |
| EP | 1 027 919 A | 8/2000 |

(Continued)

OTHER PUBLICATIONS

European Search Report, OMG AG & Co. KG, Mar. 1, 2002.

(Continued)

*Primary Examiner*—Glenn Caldarola
*Assistant Examiner*—Tom Duong
(74) *Attorney, Agent, or Firm*—Kalow & Springut LLP

(57) ABSTRACT

An exhaust gas treatment unit for the selective catalytic reduction of nitrogen oxides under lean exhaust gas conditions which contains at least one catalyst with catalytically active components for selective catalytic reduction (SCR components). The exhaust gas treatment unit is characterised in that the catalyst also contains, in addition to SCR components, at least one storage component for nitrogen oxides (NOx components).

12 Claims, 1 Drawing Sheet

FOREIGN PATENT DOCUMENTS

| | | |
|---|---|---|
| JP | 03221147 A | 9/1991 |
| JP | 09-010556 A | 1/1997 |
| JP | 11125110 A | 5/1999 |
| JP | 11221466 A | 8/1999 |
| JP | 2000157870 A | 6/2000 |
| WO | WO 94/25143 | 11/1994 |

OTHER PUBLICATIONS

JP 11-125110 A—Derwent Record, Nov. 5, 1999.
JP 09-010556 A—Derwent Record, Jan. 14, 1997.

* cited by examiner

EXHAUST GAS TREATMENT UNIT FOR THE SELECTIVE CATALYTIC REDUCTION OF NITROGEN OXIDES UNDER LEAN EXHAUST GAS CONDITIONS AND A PROCESS FOR THE TREATMENT OF EXHAUST GASES

INTRODUCTION AND BACKGROUND

The present invention provides an exhaust gas treatment unit for the selective catalytic reduction of nitrogen oxides under lean exhaust gas conditions which contains at least one catalyst with catalytically active components for selective catalytic reduction (SCR components).

Stationary combustion units in power stations and diesel engines and also lean operated gasoline engines emit an oxygen-rich exhaust gas which contains, as harmful substances, unburnt hydrocarbons (HC), carbon monoxide (CO) and nitrogen oxides (NOx). In order to remove nitrogen oxides from lean exhaust gases, use of the so-called selective catalytic reduction (SCR) process has been applied for a long time in the power station sector. Here, ammonia ($NH_3$) is supplied to the exhaust gas and this reacts selectively, on a suitable catalyst, with nitrogen oxides to give nitrogen and water. Under stationary operation, conversion rates of more than 80% can be achieved for nitrogen oxides in this way.

As a result of the legally required reduction in nitrogen oxide emissions from motor vehicles (EURO IV and EURO V in Europe by 2005 and 2008 respectively, LEV II in USA by 2007), the application of SCR technology, in particular in the case of heavy duty vehicles, is becoming more and more urgent. Due to the high toxicity and volatility of ammonia, non-toxic precursor compounds, which release ammonia under appropriate treatment, are used for mobile applications in motor vehicles. Urea in the form of an aqueous solution is preferably used. To hydrolyze urea, so-called hydrolysis catalysts which hydrolyze urea solution to give ammonia and carbon dioxide in a two-step reaction are used. The hydrolysis catalysts are located upstream of the SCR catalyst in the exhaust gas treatment unit. The urea solution is injected into the exhaust gas stream upstream of the hydrolysis catalyst with the aid of a special metering system.

The disadvantage of this type of exhaust gas treatment is the fact that both hydrolysis of urea and also selective catalytic reduction with modem SCR catalysts is initiated only above 160 to 200° C. Therefore, under operating conditions of the internal combustion engine with exhaust gas temperatures below this temperature range, nitrogen oxides produced by the engine pass through the exhaust gas treatment unit in unchanged form and are released into the environment. Modern urea metering systems take this fact into account and inject the urea solution into the exhaust gas stream only when the exhaust gas temperature is above 170° C.

An object of the present invention is to provide an exhaust gas treatment unit which is able to reduce the emission of nitrogen oxides from lean operated internal combustion engines even under operating conditions with exhaust gas temperatures below the light-off temperature for the hydrolysis of urea and for selective catalytic reduction.

A further object of the invention is to provide a process for removing nitrogen oxides from the lean exhaust gas from an internal combustion engine by selective catalytic reduction using ammonia.

SUMMARY OF THE INVENTION

The above and other objects of the invention can be achieved by an exhaust gas treatment unit for the selective catalytic reduction of nitrogen oxides under lean exhaust gas conditions which contains at least one catalyst with catalytically active components for selective catalytic reduction (SCR components). The exhaust gas treatment unit is characterised in that the catalyst contains, in addition to SCR components, at least one storage component for nitrogen oxides NOx storage components).

In the following, the light-off temperature for a catalyst is understood to be that temperature at which the intended catalytic reaction proceeds on the catalyst with a conversion rate of 50%. Thus, a hydrolysis catalyst has a light-off temperature for the hydrolysis of urea and a SCR catalyst has a light-off temperature for the conversion of nitrogen oxides.

According to the invention, it is intended that nitrogen oxides present in the exhaust gas at low exhaust gas temperatures are temporarily stored on the SCR catalyst with the aid of NOx storage components and are then released again at higher temperatures. The release of nitrogen oxides is facilitated by local excess amounts of ammonia in the exhaust gas, where the stored nitrogen oxides are reacted directly with the ammonia in an SCR reaction. This also means that if there is small overdosing of ammonia or urea solution this does not leave the SCR system, and thus the exhaust gas unit, as an ammonia slippage, but it reacts with the adsorbed nitrogen oxides and is oxidised to nitrogen. Accordingly, the function of the NOx storage components in the SCR catalyst can be compared with that of an oxygen storage material in a three-way converter catalyst.

BRIEF DESCRIPTION OF DRAWINGS

The present invention will be further understood with reference to the accompanying drawings; wherein.

DETAILED DESCRIPTION OF INVENTION

Figure 1:
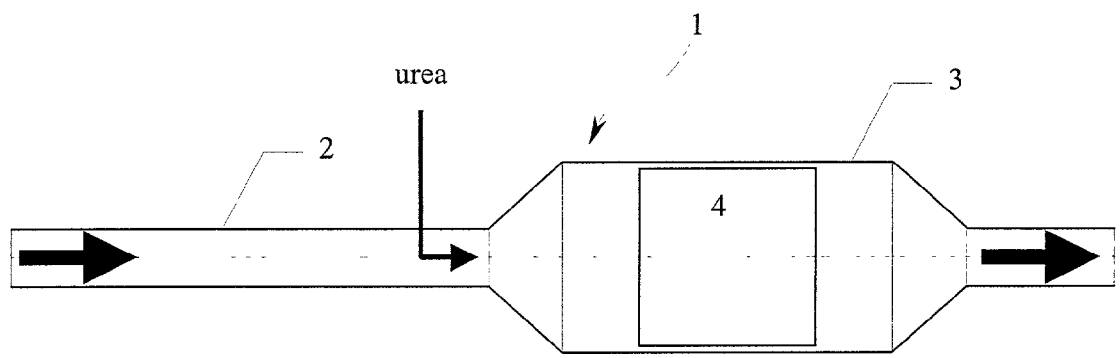
FIGS. 1 to 3 show in schematic form, preferred embodiments of the invention.

The SCR components in the catalyst may contain a solid acid system of titanium dioxide and vanadium. In addition, the solid acid system may contain at least one component selected from the group consisting of tungsten oxide ($WO_3$), molybdenum oxide ($MoO_3$), silicon dioxide, sulfate and zeolites, wherein the zeolites are present in the acid H form or may be exchanged with metal ions. Alternatively, the SCR components contain at least one zeolite, wherein the zeolites are in the acid H form or may be exchanged with metal ions. Due to their acidic properties these materials are able to store ammonia. This is advantageous under strongly varying loads of the engine.

The NOx storage components preferably contain at least one compound of elements selected from the group consisting of alkali metals, alkaline earth metals and cerium. These components are able to store nitrogen dioxide by forming nitrates. Since 60 to 95 vol. % of the exhaust gas from an internal combustion engine consists of nitrogen monoxide, depending on the particular operating status, it is recommended that nitrogen monoxide be converted to nitrogen dioxide by contact with an oxidation catalyst in order to increase the efficiency of the storage process. This requirement can be satisfied, for example, when the NOx storage component itself is catalyzed with at least one of the platinum group metals; namely, platinum, palladium, rhodium and iridium. Alternatively, or in addition, the catalyst may contain catalytically active components based on support oxides from the group of aluminum oxide, silicon dioxide, cerium oxide, zirconium oxide, titanium oxide or mixed oxides thereof catalyzed with at least one of the platinum group metals; namely, platinum, palladium, rhodium and iridium.

The catalyst may be present in the form of a honeycomb structure specified as a full extrudate, that is the components of the catalyst are processed to give an extrudable composition and then extruded to produce honeycomb structures. Such a catalyst consists entirely of the catalyst composition and is therefore also called a full catalyst. As a rule, honeycomb structures have a generally cylindrical shape which is bounded by two end faces and a surrounding face. Flow channels for the exhaust gas are arranged close together throughout the cross-section of the honeycomb structures and run from one end face to the other. The cell density is defined as the number of channels per cross-sectional area. Depending on the particular application, this may be between 5 and 300 $cm^{-2}$.

For certain applications, it may be advantageous to extrude only the SCR components to form a honeycomb structure and to apply the NOx storage components to the walls of the flow channels in the form of a coating. The techniques to be used for this are known to a person skilled in the art.

Since full catalysts generally have only low strength, the catalyst, that is the SCR components and the NOx storage components, is preferably applied in the form of a coating to the walls of the flow channels of catalytically inert support structures in the form of a honeycomb. The inert support structures preferably consist of cordierite. In a further embodiment of the catalyst, the SCR components and the NOx storage components for nitrogen oxides are applied in two separate layers to the inert support structure, wherein the NOx storage components are preferably located in the lower layer which lies directly on the inert support structure and the SCR components are located in the upper layer which makes direct contact with the exhaust gas.

Alternatively, or in addition to providing the catalyst with catalytically active components for oxidizing nitrogen monoxide to nitrogen dioxide, an oxidation catalyst may be located in the exhaust gas treatment unit, upstream of the catalyst for selective catalytic reduction, which also oxidizes nitrogen monoxide to nitrogen dioxide. In a special embodiment of this type it is preferred to use a combination comprising an oxidation catalyst upstream of a catalyst according to the invention of which the NOx storage components comprise no catalytically active platinum group metals. In this embodiment, the oxidation of nitrogen monoxide to nitrogen dioxide solely occurs at the upstream oxidation catalyst which may contain platinum on active aluminum oxide. Nitrogen dioxide formed at the oxidation catalyst will be absorbed by the NOx storage components of the catalyst according to the invention.

If the ammonia required for selective catalytic reduction is intended to be obtained by the hydrolysis of urea, then a hydrolysis catalyst is located in the exhaust gas treatment unit, between the oxidation catalyst and the catalyst for selective catalytic reduction. The urea solution to be hydrolyzed is supplied to the exhaust gas stream, using a suitable metering system, downstream of the oxidation catalyst and upstream of the hydrolysis catalyst. In the event of large overdosing of ammonia, unwanted emissions of ammonia may reach the environment. In order to avoid these emissions, a so-called ammonia barrier catalyst, which oxidizes ammonia to nitrogen and water, may be introduced into the exhaust gas treatment unit downstream of the SCR catalyst.

Using the exhaust gas treatment unit described, a process for removing nitrogen oxides from the lean exhaust gas from an internal combustion engine by selective catalytic reduction using ammonia is performed as follows. The exhaust gas is passed over a catalyst which contains catalytically active components for selective catalytic reduction (SCR components) and storage components for nitrogen oxides (NOx storage components) with at least the occasional supply of ammonia. During operational phases of the engine with exhaust gas temperatures which are below the light-off temperature of the components for selective catalytic reduction the nitrogen oxides present in the exhaust gas are absorbed by the NOx storage components. In order to avoid ammonia emissions to the environment, the introduction of ammonia (ether directly or in the form of precursor compounds) is stopped during these operational phases. On the other hand, in the event of exhaust gas temperatures above the light-off temperature for selective catalytic reduction, the supply of ammonia is resumed. As a result of the elevated exhaust gas temperatures and the ammonia present in the exhaust gas, the nitrogen oxides stored by the NOx storage components are desorbed and, together with nitrogen oxides present in the exhaust gas, react with ammonia on the SCR components in the catalyst to give nitrogen and water.

This function is different from conventional NOx storage catalysts wherein the released nitrogen oxides are reduced to nitrogen at the storage components themselves. According to the present invention the released nitrogen oxides are converted to nitrogen at the SCR-components of the catalyst.

The exhaust gas treatment unit and the process which can be performed therewith are particularly suitable for use with a diesel engine. The exhaust gas treatment unit and process, however, can also be used for the treatment of lean exhaust gases from a lean operated gasoline engine. This type of engines also comprise direct-injection gasoline engines, so-called GDI engines. During acceleration phases, such an engine also operates with a rich air/fuel mixture in order to be able to provide the power required to accelerate. These phases are suitable, according to DE 198 20 828 A1, for forming ammonia from the components in rich exhaust gas on a suitable catalyst.

DE 198 20 828 A1 describes an exhaust gas purifying system for a GDI engine. The exhaust gas purifying system comprises a first catalyst which produces ammonia from respective exhaust gas constituents at rich exhaust gas compositions. A suitable catalyst for this task is a conventional three-way catalyst. But any other catalyst optimized for forming ammonia under rich exhaust gas conditions may be employed. A second catalyst downstream of the first catalyst stores the produced ammonia and selectively reduces nitrogen oxides under lean exhaust gas conditions with the help of the stored ammonia. For such an exhaust gas purifying system it is important to provide always a sufficient amount of ammonia for complete reduction of the nitrogen oxides. In order to ensure this, a high ammonia storage capacity is required for the SCR catalyst used.

Similarly, the exhaust gas treatment unit according to the invention may also be equipped with a catalyst which forms ammonia from the exhaust gas constituents under operating points of the engine with rich exhaust gas. The advantage in this case is that in addition to the storage capacity for ammonia the catalyst possesses also a storage capacity for nitrogen oxides. This improves conversion of nitrogen oxides averaged over all operating points of the engine. Additionally the amount of urea solution metered into the exhaust gas can be reduced, or even omitted altogether.

Figure 2:
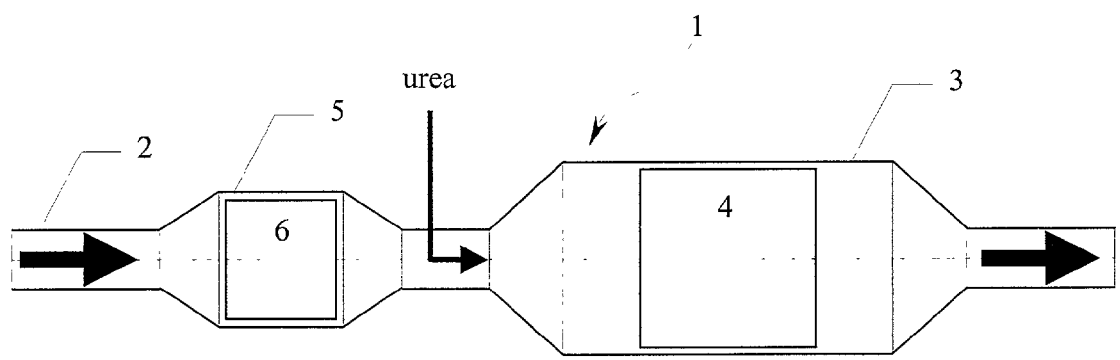
Figure 3:
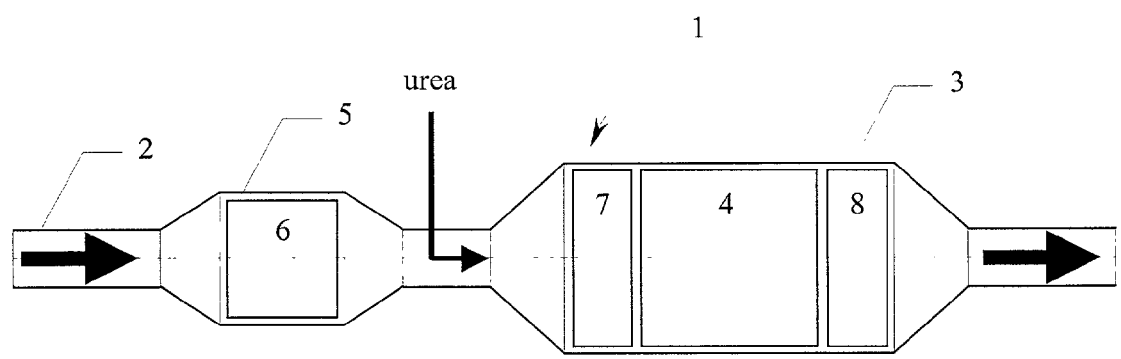

FIGS. 1 to 3 show the most preferred embodiments of the exhaust gas treatment unit of this invention. Reference numeral (1) designates the exhaust gas treatment unit comprising the exhaust pipe (2) and a converter housing (3). Built into the converter housing is the catalyst (4) containing the SCR components and at least one storage component for nitrogen oxides. The exhaust gas entering and leaving the treatment unit is visualized by two solid arrows. Urea is injected in front of the converter housing (3) as a precursor compound for ammonia which is generated from urea by hydrolysis at the catalyst (4).

FIG. 2 shows a more preferred embodiment of the invention. The exhaust gas treatment unit is supplemented by a second converter housing (5) located upstream of the first converter housing (3) and upstream of the point of injection of urea into the exhaust gas stream. This embodiment allows to improve the oxidation of nitrogen monoxide to nitrogen dioxide by using a highly active oxidation catalyst (6) comprising platinum on active alumina. Such a highly active oxidation catalyst could not be incorporated into catalyst (4) since it would also oxidize ammonia. This oxidation catalyst can be positioned close to the outlet of the engine while converter housing (3) with the catalyst according to the invention may be located in an underfloor position.

In the embodiment of FIG. 3 converter housing (3) further comprises a hydrolyzation catalyst (7) in front of catalyst (4) and an ammonia barrier catalyst (8) downstream of catalyst (4). The dedicated hydrolyzation catalyst (7) improves hydrolyzation of urea to ammonia and thus improves overall exhaust gas cleaning efficiency of the exhaust gas treatment unit. Such a hydrolyzation catalyst is well known in the art. It may comprise titanium dioxide, aluminum oxide, silicon dioxide, zirconium oxide or mixed oxides therefrom. This composition may be stabilized and enhanced in activity by the admixture of $SO_3$, $WO_3$, $Nb_2O_5$ und $MoO_3$. Suitable compositions are described for example in DE 42 03 807 A1. The ammonia barrier catalyst (8) prevents the occasional escape of ammonia into the atmosphere by oxidation to nitrogen and water. For that purpose an oxidation catalyst comprising platinum on active alumina can be used.

Further variations and modifications of the foregoing will be apparent to those skilled in the art and are intended to be encompassed by the claims appended hereto. German priority application 100 54 877.6 is relied on and incorporated herein by reference.

The invention claimed is:

1. An exhaust gas treatment unit for the selective catalytic reduction of nitrogen oxides under lean exhaust gas conditions comprising an oxidation catalyst for oxidizing nitrogen monoxide contained in the exhaust gas to nitrogen dioxide and downstream thereof one catalyst in the form of a honeycomb structure with a catalytically active component for selective catalytic reduction of nitrogen oxide and at least one storage component for nitrogen oxides, said storage component comprising at least one compound of an element selected from the group consisting of an alkali metal, an alkaline earth metal, and cerium which are able to store nitrogen dioxide by forming nitrates, and wherein said storage component for nitrogen oxides comprises no catalytically active platinum group metals.

2. The exhaust gas treatment unit according to claim 1, wherein said catalytically active component for selective catalytic reduction of nitrogen oxides is a solid acid system of titanium dioxide and vanadia.

3. The exhaust gas treatment unit according to claim 2, wherein the solid acid system also contains at least one component selected from the group consisting of tungsten oxide, molybdenum oxide, silicon dioxide, sulfate and zeolites, wherein the zeolites can be present in the acid H form or can be exchanged with metal ions.

4. The exhaust gas treatment unit according to. claim 1, wherein said catalytically active component for selective catalytic reduction of nitrogen oxides contains at least one zeolite, wherein the zeolite can be present in the acid H form or can be exchanged with metal ions.

5. The exhaust gas treatment unit according to claim 1, wherein the honeycomb structure of the catalyst is obtained by preparing an extrudable composition comprising the catalytically active component for selective catalytic reduction of nitrogen oxides and the at least one storage component for nitrogen oxides and extruding the extrudable composition to produce the honeycomb structure.

6. The exhaust gas treatment unit according to claim 1, wherein the honeycomb structure of the catalyst is a full extrudate from said catalytically active component for selective catalytic reduction of nitrogen oxides onto which are applied the nitrogen oxide storage components in the form of a coating.

7. The exhaust gas treatment unit according to claim 1, wherein the honeycomb structure of the catalyst is obtained by applying said catalytically active component for selective catalytic reduction of nitrogen oxides and the nitrogen oxide storage component in the form of a coating onto an inert carrier structure in the form of a honeycomb monolith.

8. The exhaust gas treatment unit according to claim 7, wherein said catalytically active component for selective catalytic reduction of nitrogen oxides and the nitrogen oxide storage component are present in two separate layers on the inert carrier structure.

9. The exhaust gas treatment unit according to claim 8, the layer with the nitrogen oxide storage component is applied directly to the support structure and the layer with the catalytically active component for selective catalytic reduction of nitrogen oxides is on top of the layer with the nitrogen oxide storage component and is in direct contact with the exhaust gas.

10. The exhaust gas treatment unit according to claim 1, further comprising a hydrolysis catalyst located in the exhaust gas treatment unit, between the oxidation catalyst and the catalyst for selective catalytic reduction.

11. The exhaust gas treatment unit according to claim 1, further comprising an ammonia barrier catalyst is located in the exhaust gas treatment unit, downstream of the catalyst for selective catalytic reduction.

12. An exhaust gas treatment unit for the selective catalytic reduction of nitrogen oxides under lean exhaust gas conditions, comprising:
   (a) an oxidation catalyst for oxidizing nitrogen monoxide in exhaust gas to nitrogen dioxide; and,
   (b) downstream of the oxidation catalyst a single catalyst member comprising a honeycomb support and a first layer and a second layer, wherein
      (i) the first layer contacts the honeycomb support and comprises one or more storage components for storing nitrogen oxides as nitrates, wherein the one or more storage components consist essentially of one or more compounds of an element selected from the group consisting of an alkali metal, an alkaline earth metal, and cerium; and
      (ii) wherein the second layer is in contact with exhaust gas and comprises a catalytically active component for selective catalytic reduction of nitrogen oxide.

* * * * *